US012773951B2

(12) United States Patent
Williams

(10) Patent No.: US 12,773,951 B2
(45) Date of Patent: Oct. 27, 2026

(54) VEHICLE STEP WITH AN INTEGRATED POP-UP HANDLE

(71) Applicant: Toyota Motor Engineering & Manufacturing North America, Inc., Plano, TX (US)

(72) Inventor: Paxton S. Williams, Milan, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 270 days.

(21) Appl. No.: 18/606,089

(22) Filed: Mar. 15, 2024

(65) Prior Publication Data

US 2025/0289371 A1 Sep. 18, 2025

(51) Int. Cl.
*B60R 3/02* (2006.01)

(52) U.S. Cl.
CPC ........... *B60R 3/02* (2013.01); *B60Y 2200/141* (2013.01)

(58) Field of Classification Search
CPC ............................ B60R 3/02; B60Y 2200/141
See application file for complete search history.

(56) References Cited

U.S. PATENT DOCUMENTS

| | | | | |
|---|---|---|---|---|
| 966,043 | A | 8/1910 | Nelson | |
| 3,329,443 | A | 7/1967 | Elmo et al. | |
| 3,388,925 | A | 6/1968 | Chavira et al. | |
| 3,758,134 | A | 9/1973 | Stewart | |
| 3,762,742 | A | 10/1973 | Bucklen | |
| 3,861,713 | A | 1/1975 | Mckee | |
| 3,980,319 | A | 9/1976 | Kirkpatrick | |
| 4,231,583 | A | 11/1980 | Learn | |
| 4,708,355 | A | 11/1987 | Tiede | |
| 5,897,125 | A | 4/1999 | Bundy | |
| 6,179,312 | B1 | 1/2001 | Paschke et al. | |
| 6,264,222 | B1 | 7/2001 | Johnston et al. | |
| 6,283,537 | B1 | 9/2001 | DeVore, III | |
| 6,659,484 | B2 | 12/2003 | Knodle et al. | |
| 8,042,820 | B1 | 10/2011 | Dewees | |
| 8,075,008 | B1 * | 12/2011 | Hanser | B60R 3/02 280/166 |
| 8,678,457 | B1 * | 3/2014 | Duderstadt | B60N 3/023 296/1.02 |
| 8,919,853 | B2 * | 12/2014 | Krishnan | B60R 3/02 296/62 |
| 9,187,042 | B2 | 11/2015 | Kuo | |

(Continued)

FOREIGN PATENT DOCUMENTS

| | | | |
|---|---|---|---|
| AT | 12967 | U1 | 3/2013 |
| DE | 3829652 | A1 | 3/1990 |

(Continued)

*Primary Examiner* — John D Walters
(74) *Attorney, Agent, or Firm* — Christopher G. Darrow; Darrow Mustafa, PC

(57) ABSTRACT

Systems and methods described herein relate to using multimodal foundation models. In one embodiment, a method includes adjusting a height of a handle shaft by rotation of a main shaft, wherein an upper portion of the main shaft is rotatably coupled to the handle shaft and rotating a step member providing a stepping surface between a retracted position and an extended position by the rotation of the main shaft, wherein the step member is connected to a lower portion of the main shaft.

20 Claims, 9 Drawing Sheets

(56) References Cited

U.S. PATENT DOCUMENTS

| | | | | |
|---|---|---|---|---|
| 10,173,595 | B1 * | 1/2019 | Ulrich | B60R 3/02 |
| 10,994,660 | B2 * | 5/2021 | Ngo | B62D 33/0273 |
| 12,208,771 | B2 * | 1/2025 | Ricketts | B62D 33/0273 |
| 2006/0261623 | A1 * | 11/2006 | Kuznarik | B60R 3/02<br>296/62 |
| 2022/0185190 | A1 | 6/2022 | Johnson et al. | |

FOREIGN PATENT DOCUMENTS

| | | | |
|---|---|---|---|
| DE | 4337683 | A1 | 4/1995 |
| EP | 1449722 | A1 | 8/2004 |
| EP | 3042804 | A1 | 7/2016 |
| KR | 101284318 | B1 | 7/2013 |
| WO | 2005058647 | A1 | 6/2005 |

* cited by examiner

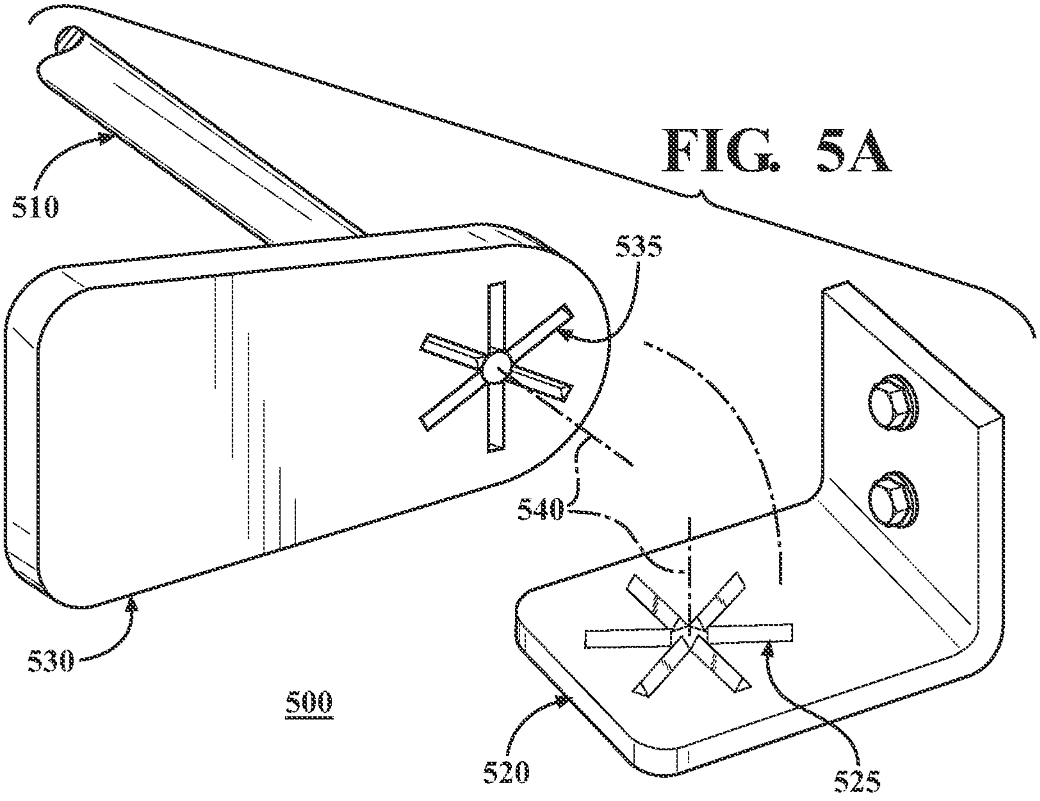
FIG. 5A
FIG. 5B
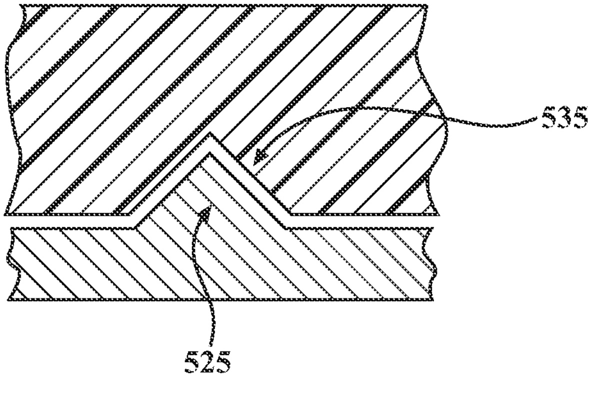

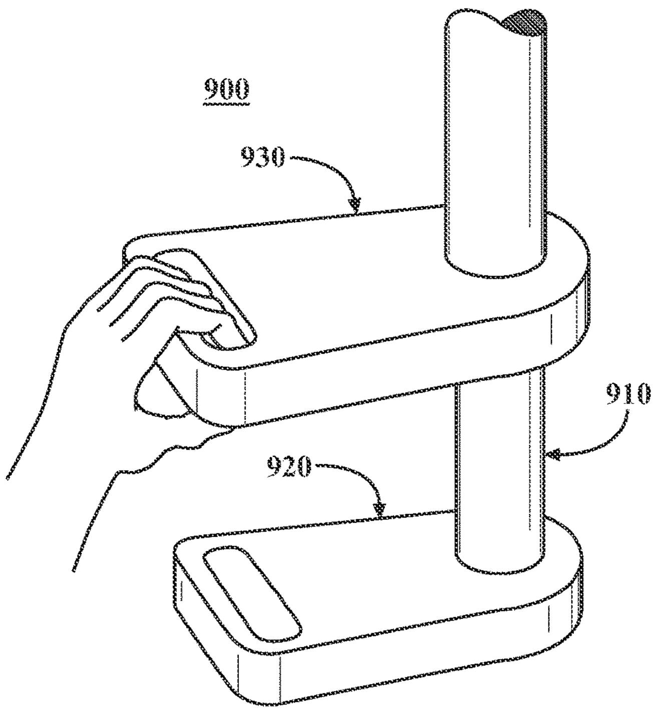
FIG. 9
FIG. 10A
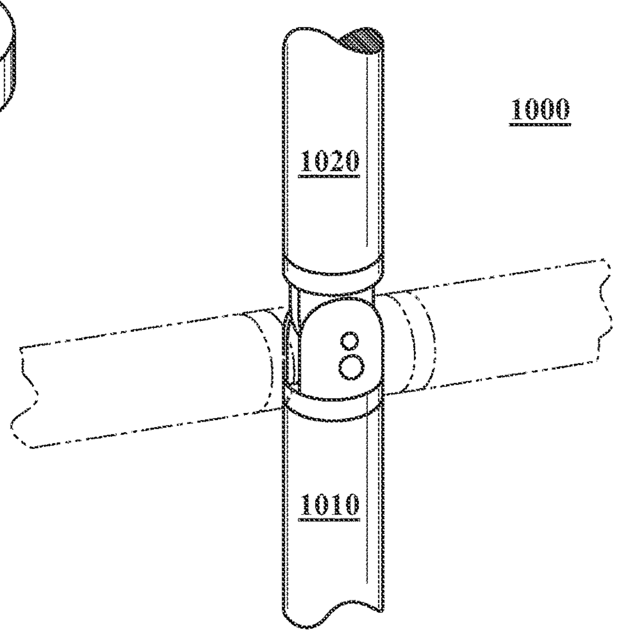
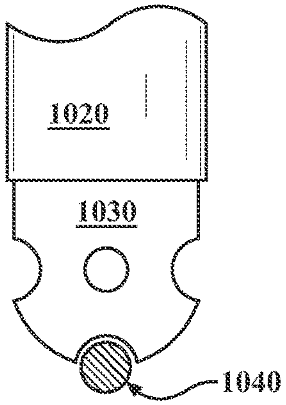
FIG. 10B
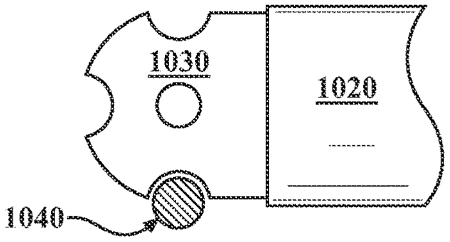
FIG. 10C

VEHICLE STEP WITH AN INTEGRATED POP-UP HANDLE

TECHNICAL FIELD

The subject matter described herein relates, in general, to a retractable vehicle step with an integrated pop-up handle.

BACKGROUND

Access to a vehicle may require the use of a step, such as where the height of the vehicle makes it more difficult to enter into or climb onto the vehicle. One approach in this regard may be to place a fixed vehicle step on the vehicle, such as a side bars, sidesteps, step bars, running boards, etc. Another approach may be to place a retractable vehicle step on the vehicle, such as a retractable side bar, sidestep, step bar, running board, etc. Typically, such a retractable vehicle step is placed below the vehicle body/frame and rotates out from underneath the vehicle for use, where the rotations occur around a longitudinal or lateral axis relative to a vehicle.

SUMMARY

In one embodiment, a system is disclosed. The system includes a main shaft having an upper portion and a lower portion, the upper portion being rotably coupled to a handle shaft, wherein the main shaft adjusts a height of the handle shaft as the main shaft rotates, and a step member providing a stepping surface connected to the lower portion of the main shaft, wherein the main shaft rotates the step member between a retracted position and an extended position.

In one embodiment, a non-transitory computer-readable medium including instructions that when executed by one or more processors cause the one or more processors to perform one or more functions is disclosed. The instructions include instructions to adjust a height of a handle shaft by rotation of a main shaft, wherein an upper portion of the main shaft is rotatably coupled to the handle shaft, and to rotate a step member providing a stepping surface between a retracted position and an extended position by the rotation of the main shaft, wherein the step member is connected to a lower portion of the main shaft.

In one embodiment, a method is disclosed. In one embodiment, the method includes adjusting a height of a handle shaft by rotation of a main shaft, wherein an upper portion of the main shaft is rotatably coupled to the handle shaft, and rotating a step member providing a stepping surface between a retracted position and an extended position by the rotation of the main shaft, wherein the step member is connected to a lower portion of the main shaft.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 5A illustrates one example of using mating surfaces to hold a foot step and main support in an alignment.

FIG. 5B illustrates another perspective of the example of using mating surfaces to hold a foot step and main support in an alignment.

FIG. 9 illustrates one example of multiple foot steps with grab handles provided by a retractable step/handle system.

FIG. 10A illustrates one example of an adjustable handle for a retractable step/handle system.

FIG. 10B illustrates one example of an adjustable handle for a retractable step/handle system.

FIG. 10C illustrates one example of an adjustable handle for a retractable step/handle system.

DETAILED DESCRIPTION

Systems, methods, and other embodiments associated with retractable vehicle steps with integrated pop-up handles are disclosed herein. The use of fixed vehicle steps may be undesirable due to the aerodynamic drag they may impose on a vehicle, vehicle styling, or other considerations. In addition, typical approaches to retractable vehicle steps do not incorporate handles but rather require that a person grab some part of the vehicle (e.g., door sill, roll bar, side of truck bed). Further, retractable vehicle steps whose rotations occur around a longitudinal or lateral axis typically require that clearance be available underneath the vehicle for the step to retract or protract.

Figure 3:
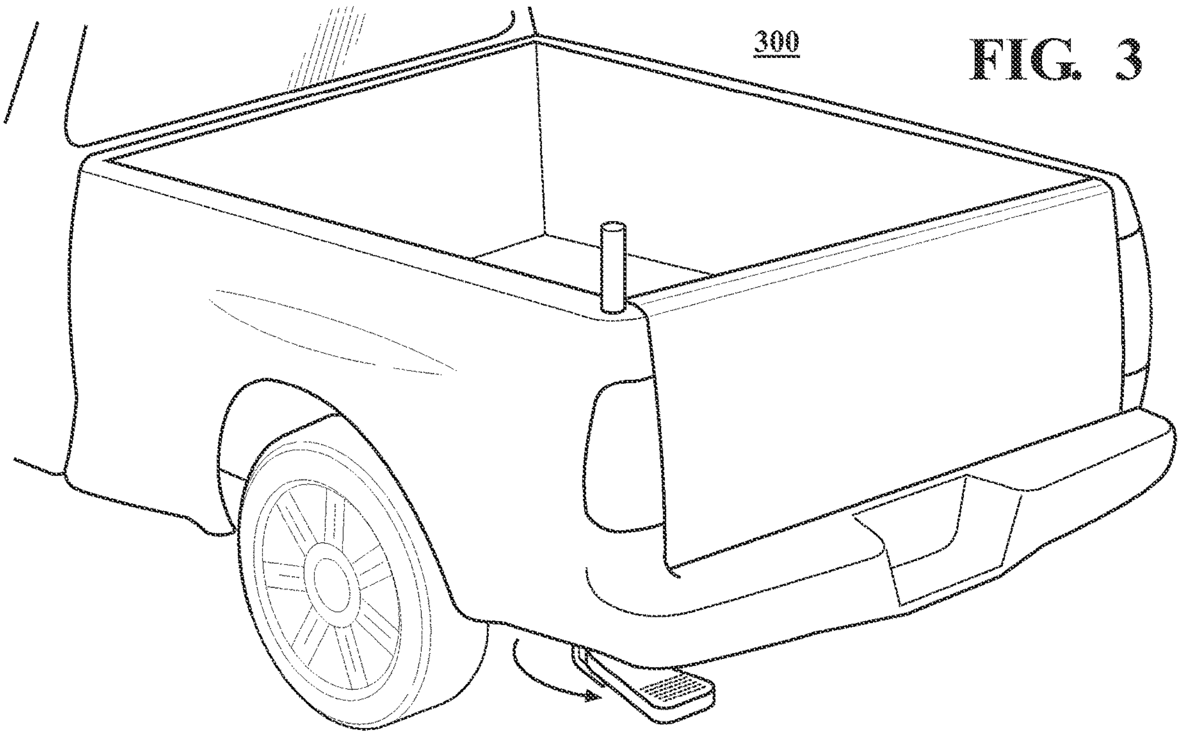
FIG. 3 illustrates one example of a retractable step/handle system.

A different approach to a retractable vehicle step is shown in FIG. 3, where a retractable step system with rotation around a vertical axis and an integrated pop-up handle is shown. Such an approach avoids the issue of clearance underneath the vehicle. In addition, the pop-up handle may provide a grab point for user that is comfortable from any angle of approach, without the risk of slipping or incurring injury due to an unseen hazard (e.g., sharp plastic or metal edges within the sidewalls of a truck bed). With such a retractable vehicle step, the integrated pop-up handle may deploy by pushing in the pop-handle, which then pops-up as the vehicle step rotates out. In addition, such an approach allows for the use of more than one rotating step, which may be useful when climbing up onto the roof of a large vehicle.

Vehicle 100 also includes various elements. It will be understood that in various embodiments it may not be necessary for vehicle 100 to have all of the elements shown in FIG. 1. Vehicle 100 may have any combination of the various elements shown in FIG. 1. Further, vehicle 100 may have additional elements to those shown in FIG. 1. In some arrangements, vehicle 100 may be implemented without one or more of the elements shown in FIG. 1. While the various elements are shown as being located within vehicle 100 in FIG. 1, it will be understood that one or more of these elements may be located external to vehicle 100. Further, the elements shown may be physically separated by large distances. For example, as discussed, one or more components of the disclosed system may be implemented within a vehicle while further components of the system are implemented within a cloud-computing environment or other system that is remote from vehicle 100.

Figure 1:
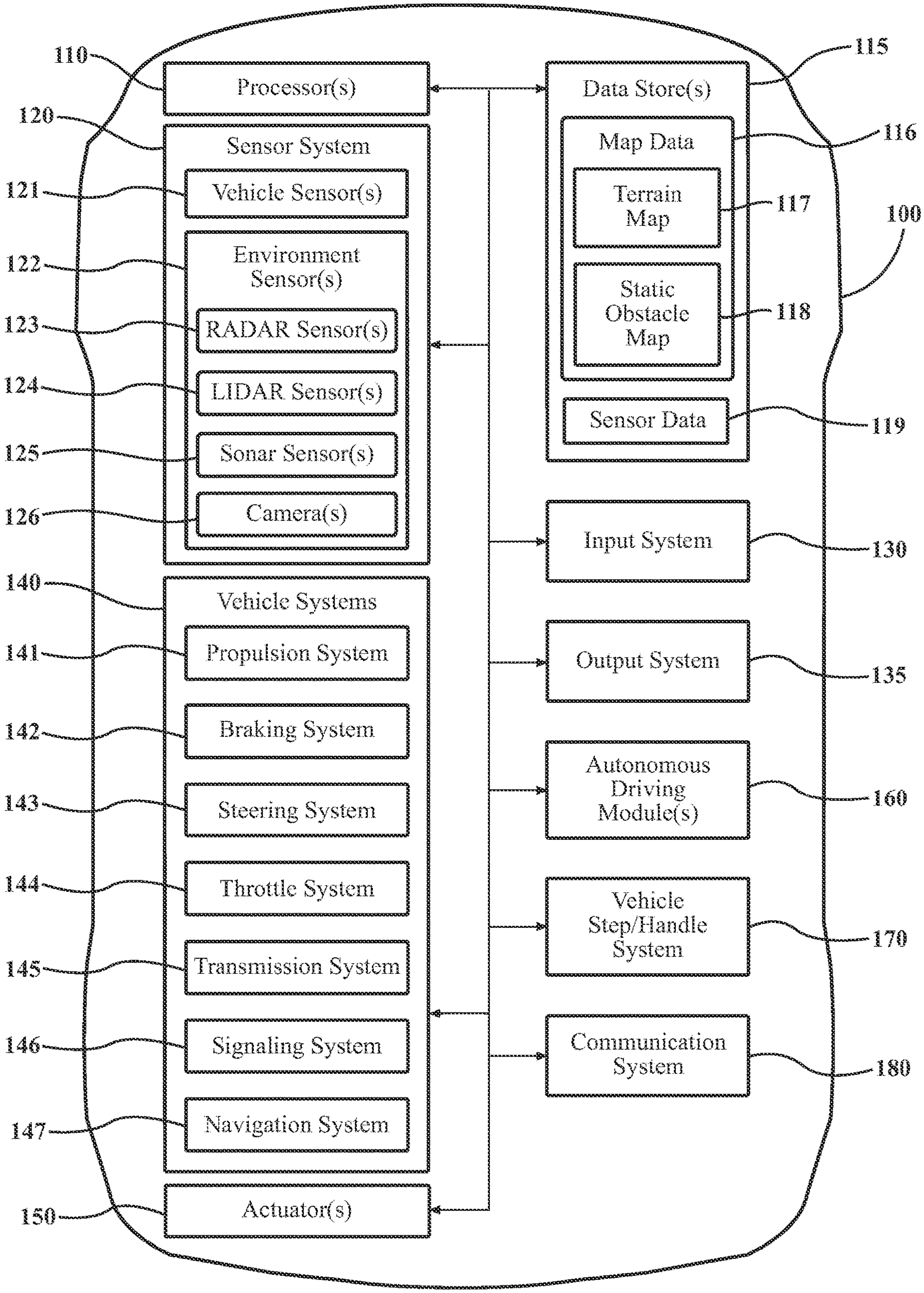
FIG. 1 illustrates one embodiment of a vehicle within which systems and methods disclosed herein may be implemented.

Some of the possible elements of vehicle 100 are shown in FIG. 1 and will be described along with subsequent figures. However, a description of many of the elements in FIG. 1 will be provided after the discussion of FIGS. 2-11 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, vehicle 100 includes vehicle step/handle system 170 that is implemented to perform methods and other functions as disclosed herein. As will be discussed in greater detail subsequently, vehicle step/handle system 170, in various embodiments, is implemented partially within vehicle 100 and as a cloud-based service. For example, in one approach, functionality associated with at least one module of vehicle step/handle system 170 is implemented within vehicle 100 while further functionality is implemented within a cloud-based computing system (e.g., handling of app requests via a mobile device to change the status of vehicle step/handle system 170).

Figure 2:
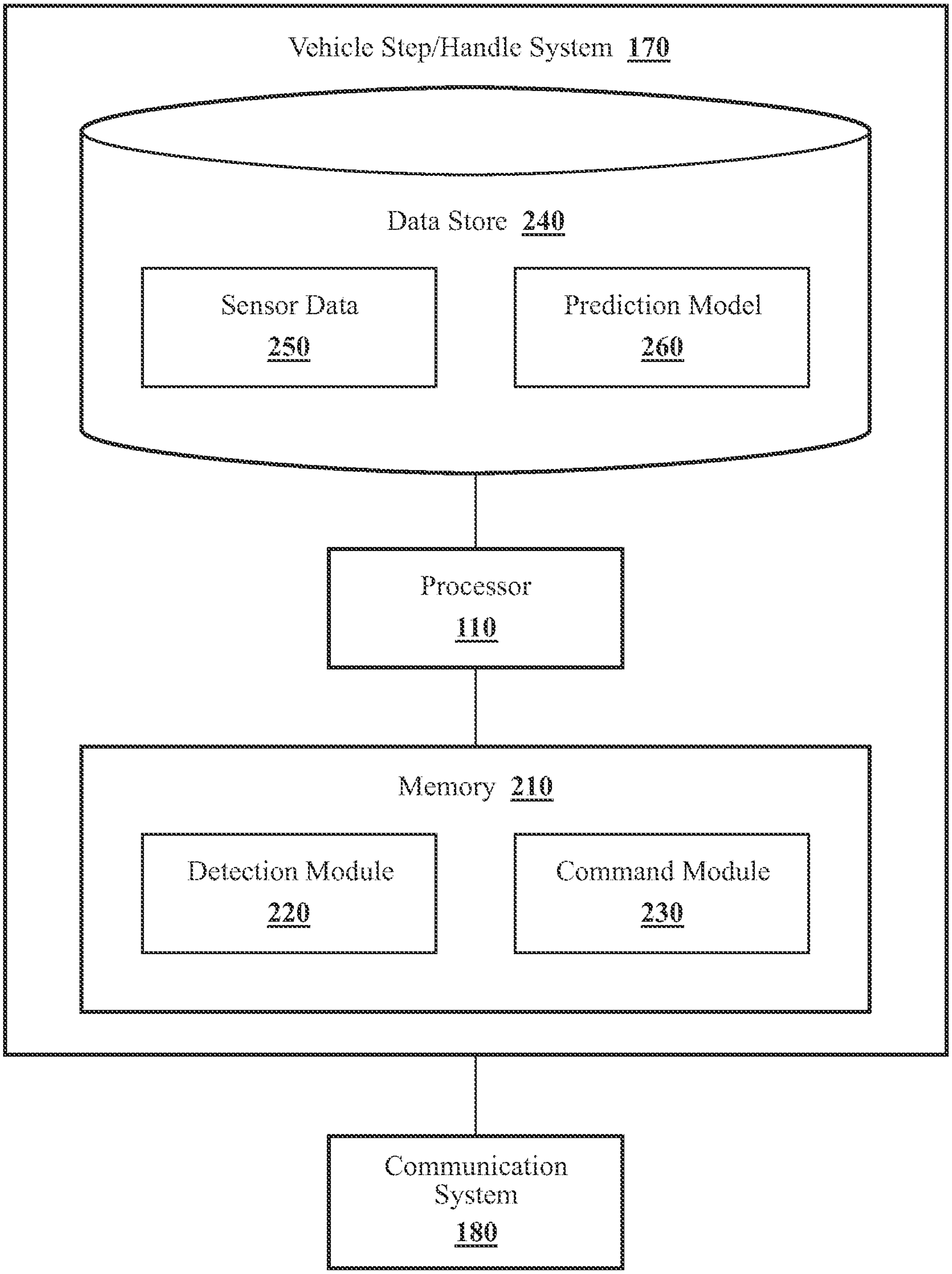
FIG. 2 illustrates one embodiment of an autonomous driving system that is associated with a retractable step/handle system.

With reference to FIG. 2, one embodiment of vehicle step/handle system 170 of FIG. 1 is further illustrated, vehicle step/handle system 170 is shown as including processor(s) 110 from vehicle 100 of FIG. 1. Accordingly, processor(s) 110 may be a part of vehicle step/handle system 170, vehicle step/handle system 170 may include a separate processor from processor 110(*s*) of vehicle 100, or vehicle step/handle system 170 may access processor 110(*s*) through a data bus or another communication path. In one embodiment, vehicle step/handle system 170 includes memory 210, which stores detection module 220 and command module 230. Memory 210 is a random-access memory (RAM), read-only memory (ROM), a hard-disk drive, a flash memory, or other suitable memory for storing detection module 220 and command module 230. Detection module 220 and command module 230 are, for example, computer-readable instructions that when executed by processor(s) 110 cause processor(s) 110 to perform the various functions disclosed herein.

Vehicle step/handle system 170 as illustrated in FIG. 2 is generally an abstracted form of vehicle step/handle system 170 as may be implemented between vehicle 100 and a cloud-computing environment. Accordingly, vehicle step/handle system 170 may be embodied at least in part within a cloud-computing environment to perform the methods described herein.

With reference to FIG. 2, detection module 220 generally includes instructions that function to control processor(s) 110 to receive data inputs from one or more sensors of vehicle 100. The inputs are, in one embodiment, observations of one or more objects in an environment proximate to vehicle 100, other aspects about the surroundings, or both. As provided for herein, detection module 220, in one embodiment, acquires sensor data 250 that includes at least camera images. In further arrangements, detection module 220 acquires sensor data 250 from further sensors such as radar 123, LiDAR 124, and other sensors as may be suitable for identifying vehicles, locations of the vehicles, lane markers, crosswalks, traffic signs, vehicle parking areas, road surface types, curbs, vehicle barriers, and so on.

Accordingly, detection module 220, in one embodiment, controls the respective sensors to provide sensor data 250. Additionally, while detection module 220 is discussed as controlling the various sensors to provide sensor data 250, in one or more embodiments, detection module 220 may employ other techniques to acquire sensor data 250 that are either active or passive. For example, detection module 220 may passively sniff sensor data 250 from a stream of electronic information provided by the various sensors to further components within vehicle 100. Moreover, detection module 220 may undertake various approaches to fuse data from multiple sensors when providing sensor data 250, from sensor data acquired over a wireless communication link (e.g., v2v) from one or more of the surrounding vehicles, or from a combination thereof. Thus, sensor data 250, in one embodiment, represents a combination of perceptions acquired from multiple sensors.

In addition to locations of surrounding vehicles, sensor data 250 may also include, for example, odometry information, GPS data, or other location data. Moreover, detection module 220, in one embodiment, controls the sensors to acquire sensor data about an area that encompasses 360 degrees about vehicle 100, which may then be stored in sensor data 250. In some embodiments, such area sensor data may be used to provide a comprehensive assessment of the surrounding environment around vehicle 100. Of course, in alternative embodiments, detection module 220 may acquire the sensor data about a forward direction alone when, for example, vehicle 100 is not equipped with further sensors to include additional regions about the vehicle or the additional regions are not scanned due to other reasons (e.g., unnecessary due to known current conditions).

Moreover, in one embodiment, vehicle step/handle system 170 includes a database 240. Database 240 is, in one embodiment, an electronic data structure stored in memory 210 or another data store and that is configured with routines that may be executed by processor(s) 110 for analyzing stored data, providing stored data, organizing stored data, and so on. Thus, in one embodiment, database 240 stores data used by the detection module 220 and command module 230 in executing various functions. In one embodiment, database 240 includes sensor data 250 along with, for example, metadata that characterize various aspects of sensor data 250. For example, the metadata may include location coordinates (e.g., longitude and latitude), relative map coordinates or tile identifiers, time/date stamps from when separate sensor data 250 was generated, and so on.

In one embodiment, command module 230 generally includes instructions that function to control the processor(s) 110 or collection of processors in a cloud-computing environment. For example, command module 230 may act to provide the electronic decision-making with respect to or in response to the status of vehicle step/handle system 170 or other aspects as described herein.

Figure 4:
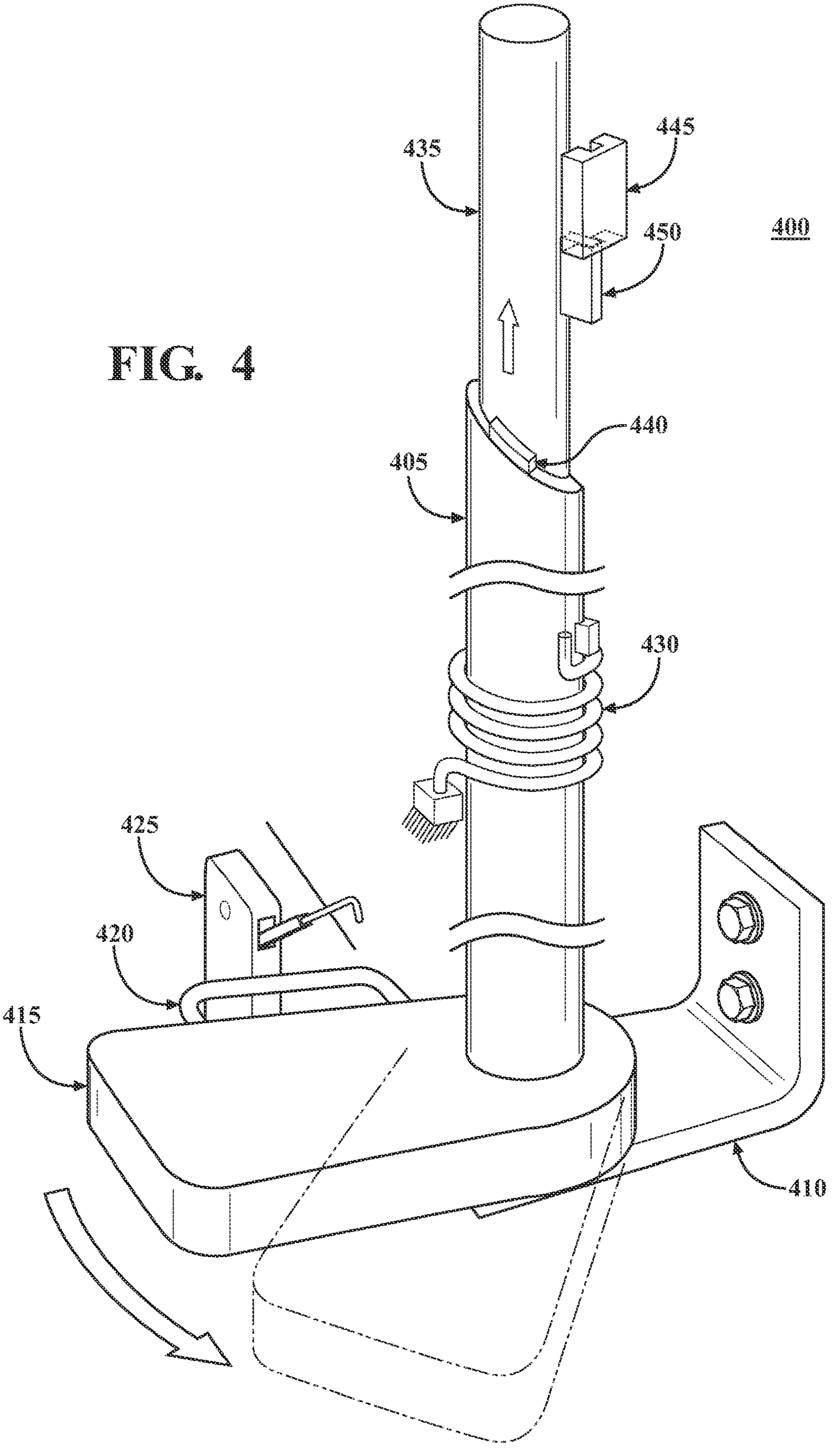
FIG. 4 illustrates one example of a retractable step/handle system.

With respect to FIG. 4, a retractable vehicle step/handle system 400 is shown that may function as part of vehicle step/handle system 170. Retractable vehicle step/handle system 400 may be comprised of main shaft 405 that may reside upon main support 410 (which may be mounted to the vehicle). Main shaft 405 may also be connected to foot step 415. Foot step 415 may be further connected to striker 420, which is capable of engaging with lock 425. Lock 425 may be further connected to an open button (e.g., such as by a rod connected to a button). Lock 425 may act to secure foot step 415 and by extension main shaft 405 in a fixed position or allow foot step 415 and main shaft 405 to rotate when disengaged. In order to ensure that main shaft 405 returns to a locked position, main shaft 405 may be connected to torsion spring 430 that may act to rotate main shaft 405 back to a locked position, and by extension retract foot step 415, if rotation of main shaft 405 is not otherwise constrained.

Main shaft 405 may also act as a cylindrical sleeve for handle shaft 435, where handle shaft 435 may be able to slide up or down partially within main shaft 405. Main shaft 405 may provide this capability through a cylindrical sleeve partially supporting handle shaft 435. In addition, handle shaft 435 may be attached to slide 440, which may ride upon the opening edge of main shaft 405 (i.e., the edge next to the opening for handle shaft 435). The opening edge of main shaft 405 may constitute a cylindrical ramp, such that handle shaft 435 is in its lowest position when foot step 415 is fully retracted, while handle shaft 435 is in its highest position when foot step is fully deployed. In some embodiments, handle shaft 435 and slide 440 may perform as above except that slide 440 resides within a groove of main shaft 405 rather than upon a cylindrical ramp. In addition, handle shaft 435 may be connected to anti-rotation slide 450 that may be partially constrained by anti-rotation member 445 as shown in FIG. 4. Accordingly, as the movement of anti-rotation slide 450 may be constrained by anti-rotation member 445, except with respect to vertical movement of anti-rotation slide 450, such a constraint may also prevent handle shaft 435 and by extension slide 440 from rotating along with main shaft 405 (e.g., vertical movement of handle shaft 435 and slide 440 is only permitted).

With respect to FIGS. 5A-B, an example is shown of an anti-rotation mechanism between main support 520 and foot step 530. As shown, main support 520 may have a set of protrusions 525 radiating out relative to where the center point of rotation for main shaft 510 aligns with main support 520 (rotation center point 540). The set of protrusions 525 may consist of ridges, bumps, or other geometric or arbitrary shapes. In some embodiments, each protrusion within the set of protrusions 525 may be identical in form but separated by a pre-determined angle relative to rotation center point 540. For example, in FIGS. 5A-B the set of protrusions 525 is shown as a set of six identical angular ridges separated from each other by 60 degrees of rotation around rotation center point 540. In some embodiments, the set of protrusions 525 may be separated from each other by an equal amount of rotation (e.g., 60 degrees), while in other embodiments the separation between protrusions in respect to rotation may vary.

Similarly, foot step 530 may have a set of indentations 535 radiating out relative to where the center point of rotation for main shaft 510 aligns with foot step 530 (rotation center point 540). The set of indentations 535 may consist of indentations in the form of recesses able to receive protrusions such as ridges, bumps, or other geometric or arbitrary shapes. In some embodiments, each indentation within the set of indentations 535 may be identical in form but separated by a pre-determined angle relative to rotation center point 540. For example, in FIGS. 5A-B the set of indentations 535 is shown as a set of six identical angular valleys separated from each other by 60 degrees of rotation around rotation center point 540. In some embodiments, the set of indentations 535 may be separated from each other by an equal amount of rotation (e.g., 60 degrees), while in other embodiments the separation between indentations in respect to rotation may vary.

In view of the above discussion, the set of indentations 535 of foot step 530 may align with the set of protrusions 525 of main support 520 in one or more positions. For example, as shown in FIG. 5A the set of indentations 535 and set of protrusions 525 may align in up to six different positions (e.g., 0 degrees, 60 degrees, 120 degrees, 180 degrees, 240 degrees, and 300 degrees). In some embodiments, constraints on the rotation of main shaft 510 (e.g., a torsion spring) may also constrain the available number of alignments between the set of indentations 535 and set of protrusions 525. In some embodiments, the available number of alignments may not be equally spaced (e.g., 0 degrees, 45 degrees, 67.5 degrees, 90 degrees), such as where specific intrusions or protrusions are not available to allow an alignment (e.g., no alignment at 22.5 degrees). In some embodiments, when foot step 530 is in an alignment as described above with main support 520, a force may be applied to foot step 530 to avoid slippage. For example, in some embodiments the force may come from the weight a vehicle operator places by stepping on foot step 530. As another example, a spring may exert a downward force on foot step 530, directly or indirectly (e.g., via main shaft 510), such that by itself or in conjunction with the weight of the user the force exerted works to prevent slippage. It should also be understood that where a main shaft extends through a step member (e.g., the step member is attached to the sides of a main shaft), the main shaft can nonetheless function as if it were part of the step member as described herein with respect to any main support.

It should be understood that while the examples provided above are provided with a set of protrusions on a main support and a set of intrusions on a foot step, similar approaches can be taken with the intrusions on the main support and protrusions on the foot step or also a mix of intrusions and protrusions on both the main support and the foot step. As such, the main support and the foot step may have a variety of different mating surfaces with respect to intrusions or protrusions that nonetheless allow for different alignments to occur between the main support and foot step (which by extension may hold a main shaft in an alignment as well, plus any handle shaft). It should also be understood that while the examples provided above are provided with the handle shaft as residing within a cylindrical sleeve of the main shaft, the systems and methods described herein can also apply to where the main shaft resides within a cylindrical sleeve of the handle shaft.

Figure 6A:
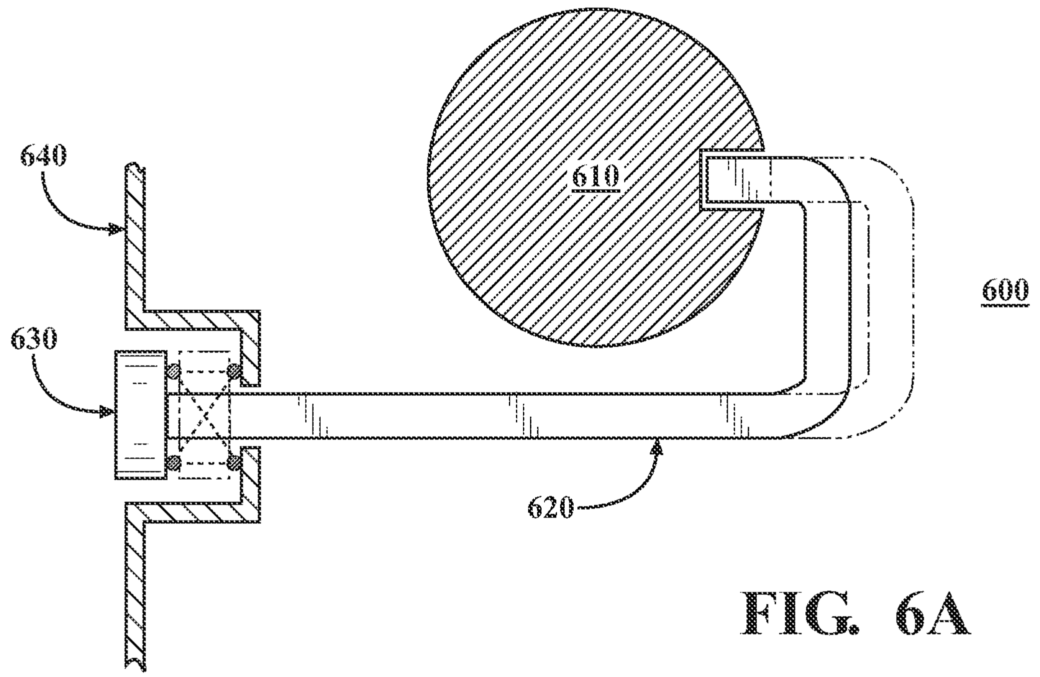
FIG. 6A illustrates one example of a locking mechanism.
Figure 6B:
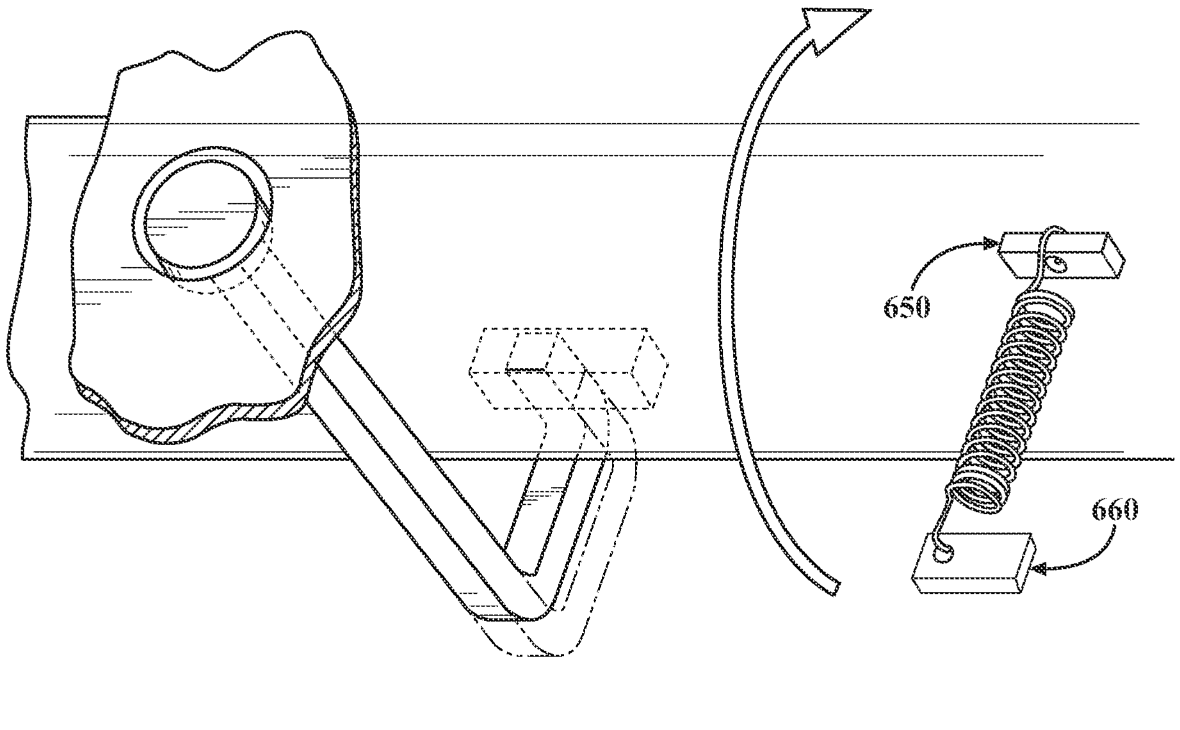
FIG. 6B illustrates another example of the locking mechanism.

With respect to FIGS. 6A and 6B, an alternative locking and rotation mechanism 600 is shown. In this example, main shaft 610 has an indentation capable of receiving lock arm 620. When lock arm 620 is engaged with main shaft 610, main shaft 610 may be unable to rotate, while main shaft 610 may be able to rotate when lock arm 620 is unengaged. Lock arm 620 may be connected to button 630 such that when button 630 is depressed, lock arm 620 disengages with main shaft 610. Button 630 or lock arm 620 may also have a mechanism exerting a force (e.g., linear spring) such that lock arm 620 re-engages with main shaft 610 if the indentation is aligned to receive lock arm 620. In some embodiments, the indentation may be instead located on the handle shaft (e.g., handle shaft 435) such that when engaged with lock arm 620 the handle may not raise or lower, which may also cause main shaft 610 to be unable to rotate. Similarly, when the indentation on the handle shaft is not engaged with lock arm 620, the handle may be able to raise or lower, which may also allow main shaft 610 to be able to rotate.

As shown in FIG. 6B, retractable vehicle step/handle system 170 may also incorporate different rotation mechanisms. For example, instead of a torsion spring, main shaft 610 may be connected to linear spring 660 via spring tab 650. In some embodiments, spring tab 650 may be located on a vehicle step (e.g., foot step 415) connected to main shaft 610. In some embodiments, linear spring 660 and spring tab 650 may be located on the handle shaft (e.g., handle shaft 435) instead of main shaft 610, except that the force of linear spring 660 is exerted vertically rather than horizontally.

Figure 7:
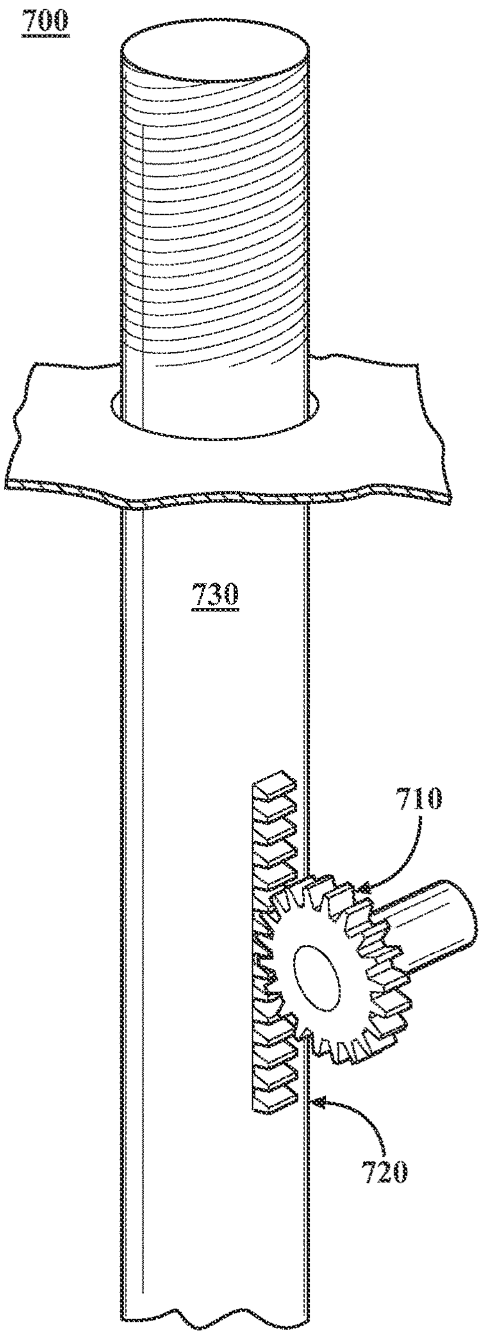
FIG. 7 illustrates one example of a pinion gear and gear tooth applied to a retractable step/handle system.

In some embodiments, a rotation or locking mechanism may be supplied by electromechanical components. For example, as shown in FIG. 7, pinion gear 710 may engage with gear teeth 720 to raise or lower handle shaft 730. In some embodiments, raising or lowering handle shaft 730 may also cause a main shaft (e.g., main shaft 405) coupled to handle shaft 730 to rotate. In some embodiments, pinion gear 710 may engage with gear teeth 720 to rotate a main shaft (e.g., main shaft 405) or an element connected to the main shaft (e.g., foot step 415), which may also cause a handle shaft (e.g., handle shaft 435) to raise or lower. In some embodiments, pinion gear 710 may be coupled to a motor that is controlled by vehicle 100. For example, pressing a button within or on the vehicle (or on a key fob, in a smartphone app, etc.) may cause vehicle 100 to retract or extend a vehicle step via the motor connected to pinion gear 710.

Figure 8:
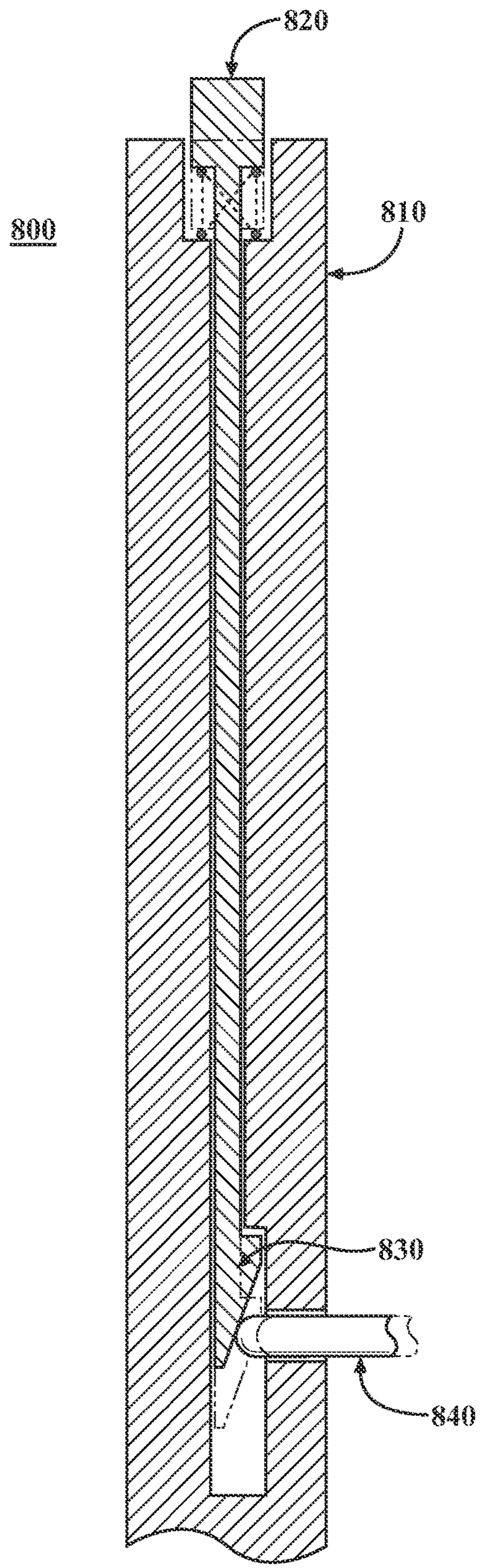
FIG. 8 illustrates one example of push-button mechanism in a handle for locking or unlocking a retractable step/handle system.

With respect to FIG. 8, an example of a push button for a handle shaft is shown. In some embodiments, a button 820 may be located within the end of handle shaft 810, such that depressing the button causes a locking mechanism to disengage through mechanical or electromechanical components (e.g., linkages, motors). For example, handle shaft 810 may have a hole that allows for locking pin 840 to enter a cavity within handle shaft 810 so as to lock handle shaft 810 in a fixed position. Button 820 may be connected to pin striker 830 that has a wedge/ramp shape on the end of pin striker 830 (e.g., opposite to button 820, as shown in FIG. 8) that acts to push the locking pin 840 out of the cavity within handle shaft 810, thereby disengaging the locking mechanism. In some embodiments, a locking mechanism within the handle may act similar to a hand brake where pressing a button in the handle shaft causes a pawl via (a push rod) to disengage with a ratchet bracket, thereby allowing the handle shaft to raise/lower, the main shaft to rotate, or a combination of both.

With respect to FIG. 9, an example of multiple foot steps on a main shaft is shown. For example, main shaft 910 may be connected to lower foot step 920 and upper foot step 930, such that both retract or extend as main shaft 910 rotates. Such an approach may be used for instance in a tall vehicle (e.g., SUV, semi, trailer, boat, train) where it would be advantageous to have retractable vehicle steps, a retractable handle, or a combination thereof available on a corner of the large vehicle. In addition, one or more of the foot steps may themselves provide grab handles when deployed as shown in FIG. 9. In some embodiments, the pop-up handle may not be present with respect to vehicle step/handle system 170, such as where foot steps are designed to provide grab handles.

While the above examples have generally described locking mechanisms that act to lock vehicle step/handle system 170 when retracted, it should be understood that such designs may also be used to lock vehicle step/handle system 170 in one or more extended positions.

With respect to FIGS. 10A-C, an example of an adjustable handle 1000 that may be used with vehicle step/handle system 170 is shown from different perspectives. Handle shaft 1010 may have a notch cut into the top so as to receive the handle insert 1030 of handle 1020 as shown in FIG. 10A. Further, handle insert 1030 may be fixed (e.g., with a pin) within the notch of handle shaft 1010 so as to be able to rotate (e.g., from −90 degrees to +90 degrees as shown). In addition, a push pin 1040 may be used to secure handle 1020 into a desired position (e.g., −90 degrees, 0 degrees, +90 degrees) through indentations located on handle insert 1030, in which push pin 1040 may be nonetheless dislodged by sufficient force applied against push pin 1040 (e.g., a person pushing against handle 1020 to change its position, the body of vehicle 100 pushing handle 1020 into an upright position as it retracts). Accordingly, adjustable handle 1000 may be used as part of a pop-handle as described herein, with the additional feature of allowing a vehicle operator to adjust the top of the pop-handle to a preferred grip position when deployed.

In some embodiments, vehicle 100 may be aware of the configuration of vehicle step/handle system 170, such as whether it is locked, unlocked, retracted, extended, or what degree of rotation the foot step(s), the height of the handle, or a combination of both are at (e.g., foot step at 45 degrees, handle half-deployed). Based on this configuration, command module 230 may cause vehicle 100 to announce, display, or otherwise indicate a notification regarding the configuration of vehicle step/handle system 170 (e.g., a warning light may be turned on if vehicle step/handle system 170 is not in a retracted configuration).

In some embodiments, command module 230 may restrict vehicle movement of vehicle 100 so long as the configuration of vehicle step/handle system 170 meets one or more conditions (e.g., do not allow vehicle to move if foot step(s) in extended configuration). In some embodiments, any movement of vehicle 100 may result in command module 230 causing vehicle step/handle system 170 to change to a specific configuration (e.g., retracted, locked). For example, if a vehicle begins to move, it may be desirable for command module 230 to cause the configuration of vehicle step/handle system 170 to change to a retracted configuration (e.g., to improve aerodynamic efficiency, pedestrian safety). As another example, when a pick-up truck arrives at its destination, command module 230 may cause vehicle step/handle system 170 to change to an extended configuration (e.g., so as to unload material from the truck bed) because the configuration history of vehicle step/handle system 170 (which may be stored in database 240) indicates vehicle step/handle system 170 was in an extended configuration prior to departure (e.g., to load materials into the truck bed).

In some embodiments, the configuration of vehicle step/handle system 170 may cause changes in lighting. For example, if the configuration indicates that vehicle step/handle system 170 is not retracted, command module 230 may turn on one or more lights of vehicle 100. For example, one or more foot step may have an embedded light that are turned on by command module 230 to shine down on another step (or the ground below) when the vehicle step/handle system 170 is in an extended configuration. As another example, if the configuration of vehicle step/handle system 170 changes (e.g., from retracted to extended), command module 230 may cause truck bed lights, roof lights, interior trailer lights, hazard lights, etc. to turn on or turn off depending on the configuration (e.g., on when extended, off when retracted). In some embodiments, command module 230 may also similarly cause bed covers, doors, or other means of access to retract, disengage, extend, unlock, lock, and so on if the configuration of vehicle step/handle system 170 changes. For example, a bed cover may retract when vehicle step/handle system 170 is in an extended configuration, then the bed cover may extend to cover the truck bed when vehicle step/handle system 170 is in a retracted configuration. In some embodiments, the configuration of vehicle step/handle system 170 may also lead command module 230 to cause vehicle 100 to raise or lower the suspension height of vehicle 100, such as where it would be beneficial for vehicle 100 to descend for easier entry when vehicle step/handle system 170 is in extended configuration.

In some embodiments, command module 230 may detect via one or more sensors that a vehicle operator wishes to change the configuration of vehicle step/handle system 170. For example, motion sensors (e.g., kick sensors) may detect a hand or foot of a vehicle operator in an area such that command module 230 causes the configuration of vehicle step/handle system 170 to change (e.g., waving one's hand or foot below the location of foot step causes the configuration to change between extended or retracted). As another example, one or more camera sensors may indicate to command module 230 that the vehicle operator is near the retractable vehicle step, such that it causes one or more lights to turn on and if the vehicle operator obstructs such lights (e.g., by placing a hand on the light), such an act may be observed by command module 230 via camera sensors and cause a change in the configuration of vehicle step/handle system 170 (e.g., unlock, extend).

In some embodiments, a vehicle operator may be able to define various settings of vehicle step/handle system 170 via command module 230. For example, the vehicle operator may instruct command module 230 to keep vehicle step/handle system 170 always in a locked configuration; to only operate when given explicit user instructions; to enable or disable features in association with vehicle step/handle system 170 (e.g., lighting, bed cover retraction/extension); and so on.

In some embodiments, vehicle step/handle system 170 may be use with non-vehicle systems, such as a storage container, furniture, utility poles, or other large objects where the use of vehicle step/handle system 170 to provide the features described herein would be advantageous. For example, vehicle step/handle system 170 may be adapted for use within a fiberglass utility pole, such that when vehicle step/handle system 170 is in a retracted configuration the general public is unable to scale the utility pole.

Figure 11:
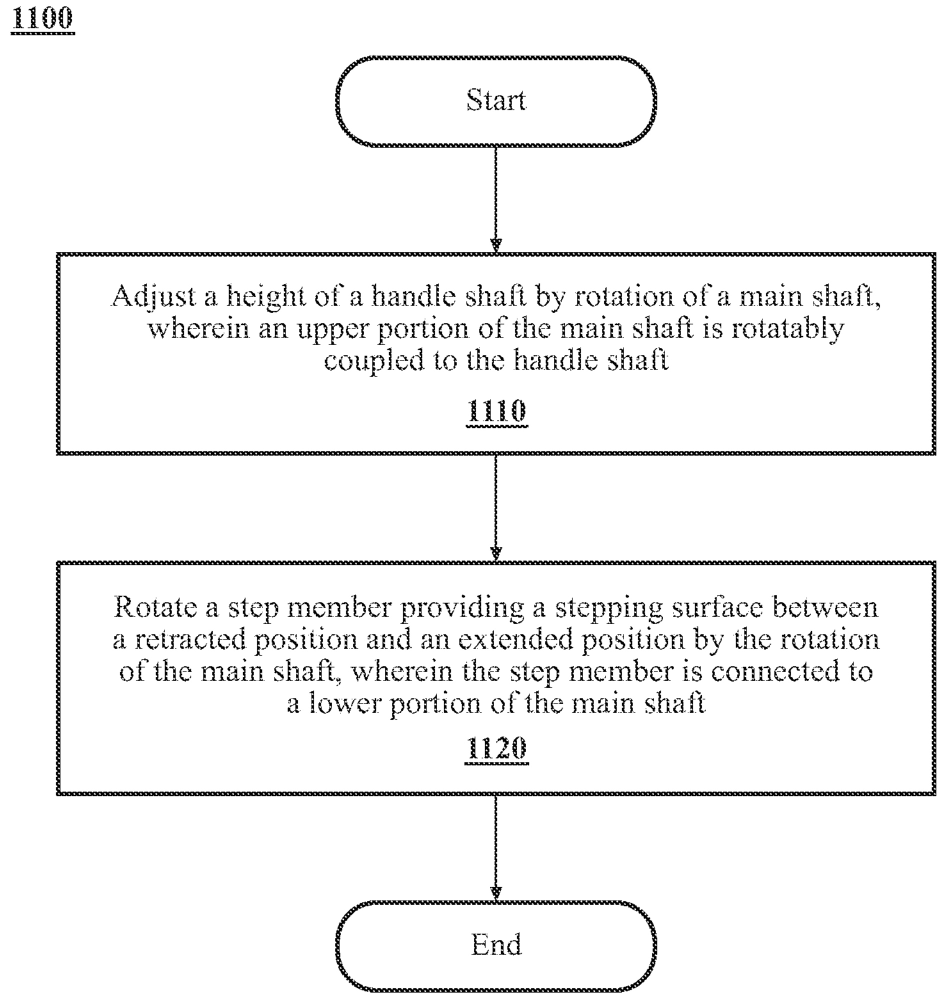
FIG. 11 illustrates one example of a method for a retractable step/handle system.

FIG. 11 illustrates a flowchart of a method 1100 that is associated with strategies for retractable steps or handles. Method 1100 will be discussed from the perspective of the vehicle step/handle system 170 of FIGS. 1 and 2. While method 1100 is discussed in combination with the vehicle step/handle system 170, it should be appreciated that the method 1100 is not limited to being implemented within vehicle step/handle system 170 but is instead one example of a system that may implement method 1100.

At step 1110, command module 230 may adjust a height of a handle shaft by rotation of a main shaft, wherein an upper portion of the main shaft is rotatably coupled to the handle shaft. For example, command module 230 may receive an indication of a button press or valid activation of a kick sensor, such that command module 230 causes a rotation of the main shaft (e.g., with an electronic motor coupled to directly or indirectly rotate the main shaft) that results in a handle shaft raising to a deployed position or lowering a handle shaft into a retracted position.

At step 1120, command module 230 may rotate a step member providing a stepping surface between a retracted position and an extended position by the rotation of the main shaft, wherein the step member is connected to a lower portion of the main shaft. For example, command module 230 may receive an indication of a button press or valid activation of a kick sensor, such that command module 230 causes a rotation of the main shaft (e.g., with an electronic motor coupled to directly or indirectly rotate the main shaft) that results in a step member moving to an extended position or a retracted position.

FIG. 1 will now be discussed in full detail as an example environment within which the system and methods disclosed herein may operate. In some instances, vehicle 100 is configured to switch selectively between various modes, such as an autonomous mode, one or more semi-autonomous operational modes, a manual mode, etc. Such switching may be implemented in a suitable manner, now known, or later developed. “Manual mode” means that all of or a majority of the navigation/maneuvering of the vehicle is performed according to inputs received from a user (e.g., human driver). In one or more arrangements, vehicle 100 may be a conventional vehicle that is configured to operate in only a manual mode.

In one or more embodiments, vehicle 100 is an autonomous vehicle. As used herein, “autonomous vehicle” refers to a vehicle that operates in an autonomous mode. “Autonomous mode” refers to using one or more computing systems to control vehicle 100, such as providing navigation/maneuvering of vehicle 100 along a travel route, with minimal or no input from a human driver. In one or more embodiments, vehicle 100 is either highly automated or completely automated. In one embodiment, vehicle 100 is configured with one or more semi-autonomous operational modes in which one or more computing systems perform a portion of the navigation/maneuvering of the vehicle along a travel route, and a vehicle operator (i.e., driver) provides inputs to the vehicle to perform a portion of the navigation/maneuvering of vehicle 100 along a travel route.

Vehicle 100 may include one or more processors 110. In one or more arrangements, processor(s) 110 may be a main processor of vehicle 100. For instance, processor(s) 110 may be an electronic control unit (ECU). Vehicle 100 may include one or more data stores 115 for storing one or more types of data. Data store(s) 115 may include volatile memory, non-volatile memory, or both. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Data store(s) 115 may be a component of processor(s) 110, or data store 115 may be operatively connected to processor(s) 110 for use thereby. The term “operatively connected,” as used throughout this description, may include direct or indirect connections, including connections without direct physical contact.

In one or more arrangements, data store(s) 115 may include map data 116. Map data 116 may include maps of one or more geographic areas. In some instances, map data 116 may include information or data on roads, traffic control devices, road markings, structures, features, landmarks, or any combination thereof in the one or more geographic areas. Map data 116 may be in any suitable form. In some instances, map data 116 may include aerial views of an area. In some instances, map data 116 may include ground views of an area, including 360-degree ground views. Map data 116 may include measurements, dimensions, distances, information, or any combination thereof for one or more items included in map data 116. Map data 116 may also include measurements, dimensions, distances, information, or any combination thereof relative to other items included in map data 116. Map data 116 may include a digital map with information about road geometry. Map data 116 may be high quality, highly detailed, or both.

In one or more arrangements, map data 116 may include one or more terrain maps 117. Terrain map(s) 117 may include information about the ground, terrain, roads, surfaces, other features, or any combination thereof of one or more geographic areas. Terrain map(s) 117 may include elevation data in the one or more geographic areas. Terrain map(s) 117 may be high quality, highly detailed, or both. Terrain map(s) 117 may define one or more ground surfaces, which may include paved roads, unpaved roads, land, and other things that define a ground surface.

In one or more arrangements, map data 116 may include one or more static obstacle maps 118. Static obstacle map(s) 118 may include information about one or more static obstacles located within one or more geographic areas. A "static obstacle" is a physical object whose position does not change or substantially change over a period of time and whose size does not change or substantially change over a period of time. Examples of static obstacles include trees, buildings, curbs, fences, railings, medians, utility poles, statues, monuments, signs, benches, furniture, mailboxes, large rocks, hills. The static obstacles may be objects that extend above ground level. The one or more static obstacles included in static obstacle map(s) 118 may have location data, size data, dimension data, material data, other data, or any combination thereof, associated with it. Static obstacle map(s) 118 may include measurements, dimensions, distances, information, or any combination thereof for one or more static obstacles. Static obstacle map(s) 118 may be high quality, highly detailed, or both. Static obstacle map(s) 118 may be updated to reflect changes within a mapped area.

Data store(s) 115 may include sensor data 119. In this context, "sensor data" means any information about the sensors that vehicle 100 is equipped with, including the capabilities and other information about such sensors. As will be explained below, vehicle 100 may include sensor system 120. Sensor data 119 may relate to one or more sensors of sensor system 120. As an example, in one or more arrangements, sensor data 119 may include information on one or more LIDAR sensors 124 of sensor system 120.

In some instances, at least a portion of map data 116 or sensor data 119 may be located in data stores(s) 115 located onboard vehicle 100. Alternatively, or in addition, at least a portion of map data 116 or sensor data 119 may be located in data stores(s) 115 that are located remotely from vehicle 100.

As noted above, vehicle 100 may include sensor system 120. Sensor system 120 may include one or more sensors. "Sensor" means any device, component, or system that may detect or sense something. The one or more sensors may be configured to sense, detect, or perform both in real-time. As used herein, the term "real-time" means a level of processing responsiveness that a user or system senses as sufficiently immediate for a particular process or determination to be made, or that enables the processor to keep up with some external process.

In arrangements in which sensor system 120 includes a plurality of sensors, the sensors may work independently from each other. Alternatively, two or more of the sensors may work in combination with each other. In such an embodiment, the two or more sensors may form a sensor network. Sensor system 120, the one or more sensors, or both may be operatively connected to processor(s) 110, data store(s) 115, another element of vehicle 100 (including any of the elements shown in FIG. 1), or any combination thereof. Sensor system 120 may acquire data of at least a portion of the external environment of vehicle 100 (e.g., nearby vehicles).

Sensor system 120 may include any suitable type of sensor. Various examples of different types of sensors will be described herein. However, it will be understood that the embodiments are not limited to the particular sensors described. Sensor system 120 may include one or more vehicle sensors 121. Vehicle sensor(s) 121 may detect, determine, sense, or acquire in a combination thereof information about vehicle 100 itself. In one or more arrangements, vehicle sensor(s) 121 may be configured to detect, sense, or acquire in a combination thereof position and orientation changes of vehicle 100, such as, for example, based on inertial acceleration. In one or more arrangements, vehicle sensor(s) 121 may include one or more accelerometers, one or more gyroscopes, an inertial measurement unit (IMU), a dead-reckoning system, a global navigation satellite system (GNSS), a global positioning system (GPS), a navigation system 147, other suitable sensors, or any combination thereof. Vehicle sensor(s) 121 may be configured to detect, sense, or acquire in a combination thereof one or more characteristics of vehicle 100. In one or more arrangements, vehicle sensor(s) 121 may include a speedometer to determine a current speed of vehicle 100.

Alternatively, or in addition, sensor system 120 may include one or more environment sensors 122 configured to acquire, sense, or acquire in a combination thereof driving environment data. "Driving environment data" includes data or information about the external environment in which an autonomous vehicle is located or one or more portions thereof. For example, environment sensor(s) 122 may be configured to detect, quantify, sense, or acquire in any combination thereof obstacles in at least a portion of the external environment of vehicle 100, information/data about such obstacles, or a combination thereof. Such obstacles may be comprised of stationary objects, dynamic objects, or a combination thereof. Environment sensor(s) 122 may be configured to detect, measure, quantify, sense, or acquire in any combination thereof other things in the external environment of vehicle 100, such as, for example, lane markers, signs, traffic lights, traffic signs, lane lines, crosswalks, curbs proximate to vehicle 100, off-road objects, etc.

Various examples of sensors of sensor system 120 will be described herein. The example sensors may be part of the one or more environment sensor(s) 122, the one or more vehicle sensors 121, or both. However, it will be understood that the embodiments are not limited to the particular sensors described.

As an example, in one or more arrangements, sensor system 120 may include one or more radar sensors 123, one or more LIDAR sensors 124, one or more sonar sensors 125, one or more cameras 126, or any combination thereof. In one or more arrangements, camera(s) 126 may be high dynamic range (HDR) cameras or infrared (IR) cameras.

Vehicle 100 may include an input system 130. An "input system" includes any device, component, system, element or arrangement or groups thereof that enable information/data to be entered into a machine. Input system 130 may receive an input from a vehicle passenger (e.g., a driver or a passenger). Vehicle 100 may include an output system 135. An "output system" includes any device, component, or arrangement or groups thereof that enable information/data to be presented to a vehicle passenger (e.g., a person, a vehicle passenger, etc.).

Vehicle 100 may include one or more vehicle systems 140. Various examples of vehicle system(s) 140 are shown in FIG. 1. However, vehicle 100 may include more, fewer, or different vehicle systems. It should be appreciated that although particular vehicle systems are separately defined, each or any of the systems or portions thereof may be otherwise combined or segregated via hardware, software, or a combination thereof within vehicle 100. Vehicle 100 may include a propulsion system 141, a braking system 142, a steering system 143, throttle system 144, a transmission system 145, a signaling system 146, a navigation system 147, other systems, or any combination thereof. Each of these systems may include one or more devices, components, or combinations thereof, now known or later developed.

Navigation system 147 may include one or more devices, applications, or combinations thereof, now known or later developed, configured to determine the geographic location of the vehicle 100, to determine a travel route for vehicle 100, or to determine both. Navigation system 147 may include one or more mapping applications to determine a travel route for vehicle 100. Navigation system 147 may include a global positioning system, a local positioning system, a geolocation system, or any combination thereof.

Processor(s) 110, vehicle step/handle system 170, automated driving module(s) 160, or any combination thereof may be operatively connected to communicate with various aspects of vehicle system(s) 140 or individual components thereof. For example, returning to FIG. 1, processor(s) 110, automated driving module(s) 160, or a combination thereof may be in communication to send or receive information from various aspects of vehicle system(s) 140 to control the movement, speed, maneuvering, heading, direction, etc. of vehicle 100. Processor(s) 110, vehicle step/handle system 170, automated driving module(s) 160, or any combination thereof may control some or all of these vehicle system(s) 140 and, thus, may be partially or fully autonomous.

Processor(s) 110, vehicle step/handle system 170, automated driving module(s) 160, or any combination thereof may be operable to control at least one of the navigation or maneuvering of vehicle 100 by controlling one or more of vehicle systems 140 or components thereof. For instance, when operating in an autonomous mode, processor(s) 110, vehicle step/handle system 170, automated driving module(s) 160, or any combination thereof may control the direction, speed, or both of vehicle 100. Processor(s) 110, vehicle step/handle system 170, automated driving module(s) 160, or any combination thereof may cause vehicle 100 to accelerate (e.g., by increasing the supply of fuel provided to the engine), decelerate (e.g., by decreasing the supply of fuel to the engine, by applying brakes), change direction (e.g., by turning the front two wheels), or perform any combination thereof. As used herein, "cause" or "causing" means to make, force, compel, direct, command, instruct, enable, or in any combination thereof an event or action to occur or at least be in a state where such event or action may occur, either in a direct or indirect manner.

Vehicle 100 may include one or more actuators 150. Actuator(s) 150 may be any element or combination of elements operable to modify, adjust, alter, or in any combination thereof one or more of vehicle systems 140 or components thereof to responsive to receiving signals or other inputs from processor(s) 110, automated driving module(s) 160, or a combination thereof. Any suitable actuator may be used. For instance, actuator(s) 150 may include motors, pneumatic actuators, hydraulic pistons, relays, solenoids, and piezoelectric actuators, just to name a few possibilities.

Vehicle 100 may include one or more modules, at least some of which are described herein. The modules may be implemented as computer-readable program code that, when executed by processor(s) 110, implement one or more of the various processes described herein. One or more of the modules may be a component of processor(s) 110, or one or more of the modules may be executed on or distributed among other processing systems to which processor(s) 110 is operatively connected. The modules may include instructions (e.g., program logic) executable by processor(s) 110. Alternatively, or in addition, data store(s) 115 may contain such instructions.

In one or more arrangements, one or more of the modules described herein may include artificial or computational intelligence elements, e.g., neural network, fuzzy logic, or other machine learning algorithms. Further, in one or more arrangements, one or more of the modules may be distributed among a plurality of the modules described herein. In one or more arrangements, two or more of the modules described herein may be combined into a single module.

Vehicle 100 may include one or more autonomous driving modules 160. Automated driving module(s) 160 may be configured to receive data from sensor system 120 or any other type of system capable of capturing information relating to vehicle 100, the external environment of the vehicle 100, or a combination thereof. In one or more arrangements, automated driving module(s) 160 may use such data to generate one or more driving scene models. Automated driving module(s) 160 may determine position and velocity of vehicle 100. Automated driving module(s) 160 may determine the location of obstacles, obstacles, or other environmental features including traffic signs, trees, shrubs, neighboring vehicles, pedestrians, etc.

Automated driving module(s) 160 may be configured to receive, determine, or in a combination thereof location information for obstacles within the external environment of vehicle 100, which may be used by processor(s) 110, one or more of the modules described herein, or any combination thereof to estimate: a position or orientation of vehicle 100; a vehicle position or orientation in global coordinates based on signals from a plurality of satellites or other geolocation systems; or any other data/signals that could be used to determine a position or orientation of vehicle 100 with respect to its environment for use in either creating a map or determining the position of vehicle 100 in respect to map data.

Automated driving module(s) 160 either independently or in combination with vehicle step/handle system 170 may be configured to determine travel path(s), current autonomous driving maneuvers for vehicle 100, future autonomous driving maneuvers, modifications to current autonomous driving maneuvers, etc. Such determinations by automated driving module(s) 160 may be based on data acquired by sensor system 120, driving scene models, data from any other suitable source such as determinations from sensor data 250, or any combination thereof. In general, automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of vehicle 100, changing travel lanes, merging into a travel lane, and reversing, just to name a few possibilities. Automated driving module(s) 160 may be configured to implement driving maneuvers. Automated driving module(s) 160 may cause, directly or indirectly, such autonomous driving maneuvers to be implemented. As used herein, "cause" or "causing" means to make, command, instruct, enable, or in any combination thereof an event or action to occur or at least be in a state where such event or action may occur, either in a direct or indirect manner. Automated driving module(s) 160 may be configured to execute various vehicle functions, whether individually or in combination, to transmit data to, receive data from, interact with, or to control vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components, or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein may be embodied in other forms without departing from the spirit or essential attributes thereof. Accordingly, reference should be made to the following claims, rather than to the foregoing specification, as indicating the scope hereof.

What is claimed is:

1. A system, comprising:

a main shaft having an upper portion and a lower portion, the upper portion being connected to a handle shaft, wherein the upper portion adjusts a height of the handle shaft as the main shaft rotates; and a step member providing a stepping surface connected to the lower portion of the main shaft, wherein the main shaft rotates the step member between a retracted position and an extended position.

2. The system of claim 1, further comprising:

a main support rotatably connected to support the step member, wherein the main support has a first mating surface capable of aligning to a second mating surface on the step member in at least one position.

3. The system of claim 1, further comprising:

a locking mechanism capable of preventing rotation of the main shaft.

4. The system of claim 3, further comprising:

a button mechanism in the handle shaft that is capable of operating the locking mechanism.

5. The system of claim 1, further comprising:

a spring mechanism that rotates the main shaft if rotation of the main shaft is not constrained.

6. The system of claim 1, further comprising:

a rotatable handle connected to the handle shaft opposite to the main shaft.

7. The system of claim 1, wherein the step member incorporates a grab handle.

8. A non-transitory computer-readable medium including instructions that when executed by one or more processors cause the one or more processors to:

adjust a height of a handle shaft via an upper portion of a main shaft by rotation of the main shaft, wherein the upper portion of the main shaft is connected to the handle shaft; and rotate a step member providing a stepping surface between a retracted position and an extended position by the rotation of the main shaft, wherein the step member is connected to a lower portion of the main shaft.

9. The non-transitory computer-readable medium of claim 8, wherein the instructions further include to:

support the step member via a main support rotatably connected to support the step member, wherein the main support has a first mating surface capable of aligning to a second mating surface on the step member in at least one position.

10. The non-transitory computer-readable medium of claim 8, wherein the instructions further include to:

lock the main shaft to prevent a subsequent rotation of the main shaft.

11. The non-transitory computer-readable medium of claim 10, wherein the instructions further include to:

unlock the main shaft to allow the subsequent rotation based on a button in the handle shaft being pushed.

12. The non-transitory computer-readable medium of claim 8, wherein the instructions further include to:

rotate the main shaft if the main shaft is not locked or otherwise held in an alignment until the step member is in the retracted position.

13. The non-transitory computer-readable medium of claim 8, wherein the instructions further include to:

deploy a rotatable handle connected to the handle shaft opposite to the main shaft, wherein the rotatable handle is adjustable when deployed.

14. A method, comprising the steps of:

adjusting a height of a handle shaft via an upper portion of a main shaft by rotation of the main shaft, wherein the upper portion of the main shaft is connected to the handle shaft; and rotating a step member providing a stepping surface between a retracted position and an extended position by the rotation of the main shaft, wherein the step member is connected to a lower portion of the main shaft.

15. The method of claim 14, further comprising the step of:

supporting the step member via a main support rotatably connected to support the step member, wherein the main support has a first mating surface capable of aligning to a second mating surface on the step member in at least one position.

16. The method of claim 14, further comprising the step of:

locking the main shaft to prevent a subsequent rotation of the main shaft.

17. The method of claim 16, further comprising the step of:

unlocking the main shaft to allow the subsequent rotation based on a button in the handle shaft being pushed.

18. The method of claim 14, further comprising the step of:

rotating the main shaft if the main shaft is not locked or otherwise held in an alignment until the step member is in the retracted position.

19. The method of claim 14, further comprising the step of:

deploying a rotatable handle connected to the handle shaft opposite to the main shaft, wherein the rotatable handle is adjustable when deployed.

20. The method of claim 14, further comprising the step of:

providing a grab handle within the step member when the step member is in the extended position.

* * * * *